United States Patent [19]

Sakamoto

[11] Patent Number: 4,663,672
[45] Date of Patent: May 5, 1987

[54] IMAGE READING APPARATUS

[75] Inventor: Masahiro Sakamoto, Tokyo, Japan

[73] Assignee: Canon Kabushiki Kaisha, Tokyo, Japan

[21] Appl. No.: 656,671

[22] Filed: Oct. 1, 1984

[30] Foreign Application Priority Data

Oct. 6, 1983 [JP] Japan .................................. 58-185991

[51] Int. Cl.⁴ ............................................ H04N 1/024
[52] U.S. Cl. ................................ 358/294; 358/213.23; 358/280; 358/293
[58] Field of Search ............... 358/285, 287, 280, 264, 358/267, 293, 294, 213; 250/578, 200

[56] References Cited

U.S. PATENT DOCUMENTS

| | | | |
|---|---|---|---|
| 4,217,611 | 8/1980 | Ogawa | 358/285 |
| 4,296,441 | 10/1981 | Ogawawara | 358/285 |
| 4,423,439 | 12/1983 | Watanabe | 358/287 |

Primary Examiner—Edward L. Coles, Sr.
Attorney, Agent, or Firm—Fitzpatrick, Cella, Harper & Scinto

[57] ABSTRACT

This invention intends to reduce a variation in scanning line density by synchronously performing the storage of an image signal that should be outputted and the movement of an original. The timing for synchronization of the storage of the image signal with the movement of the original is stabilized by use of a reading request pulse.

7 Claims, 4 Drawing Figures

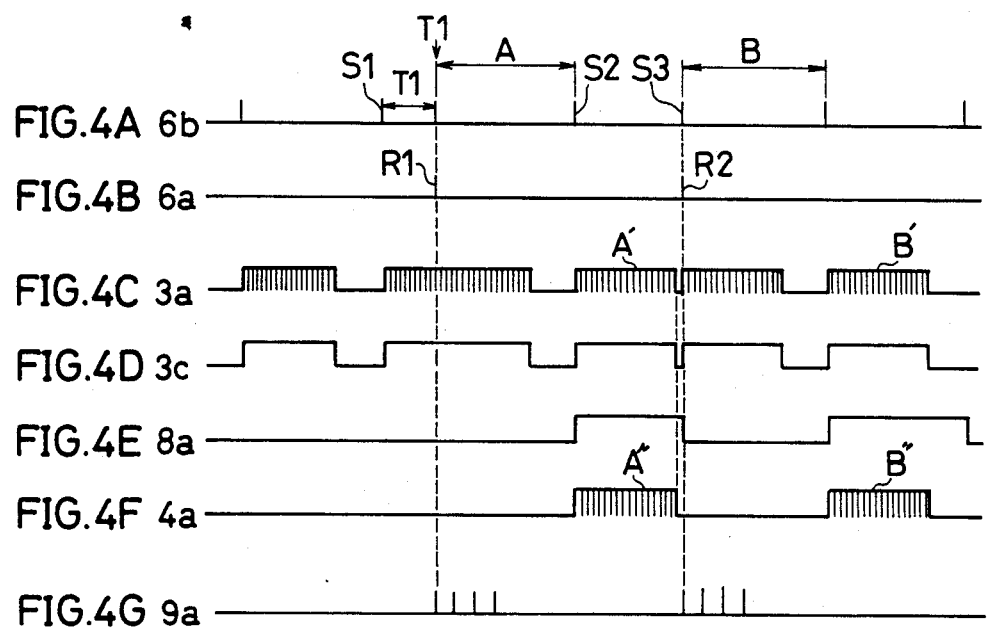

IMAGE READING APPARATUS

BACKGROUND OF THE INVENTION

1. Field of the Invention

The present invention relates to an image reading apparatus for reading an image signal by using a linear image sensor which stores the image signal of one scanning line in a predetermined time period.

2. Description of the Prior Art

An image reading apparatus using an image sensor, e.g., a CCD (Charge Coupled Device) linear image sensor for storing an image signal of one scanning line in the main scanning direction in a predetermined time period is widely used as an image reading apparatus for equipment such as a facsimile or the like. A conventional image reading method used in this kind of image reading apparatus will now be explained with reference to FIGS. 1(a) to 1(f). FIGS. 1(a) to 1(f) are timing charts showing the timing of a signal at the reading time in each section of the image reading apparatus according to a conventional image reading method.

A start pulse shown in FIG. 1(a) is outputted to a linear image sensor at a predetermined period from a control section of the image reading apparatus at the time of reading. Synchronously with this start pulse, the charges corresponding to the amount of light received in the linear image sensor are accumulated, namely, the image signal of one scanning line in the main scanning direction of an original is stored for the storage interval between the start pulse and the next start pulse.

In addition, as shown in FIG. 1(b), synchronously with this start pulse, the image signal stored in the linear image sensor for the storage interval immediately before the output of that start pulse is read out as a turn-out signal for a predetermined period shorter than the storage interval and is led to a gate connected to an output terminal of the image reading apparatus.

When a reading request pulse shown in FIG. 1(c) is applied, a gate signal shown in FIG. 1(d) is outputted from the control section to the gate synchronously with the start pulse immediately after that pulse. Thus, the gate is opened and the turn-out signal of FIG. 1(b) is outputted as an output signal shown in FIG. 1(e).

On the other hand, a pulse of an original drive signal shown in FIG. 1(f) is supplied from the control section to an original drive section synchronously with the start pulse immediately after the reading request pulse, thereby allowing the original to be moved by one scanning line.

In the foregoing conventional reading method, the storage and turn-out of the image signal of one scanning line of the original are carried out synchronously with the start pulse which is generated at a predetermined period; the image signal which is turned out is read out synchronously with the start pulse immediately after the reading request pulse was generated; and the original is moved by one scanning line synchronously with that start pulse.

However, according to such a reading method, there occur cases where the image signal stored when the original is at rest is outputted at the timing of the reading request pulse, and cases where the image signal stored when the original is moving is outputted.

Namely, according to this method, in the case where the reading request pulse is generated in a storage interval over a predetermined period after the immediately preceding reading request pulse, the original is not driven but is at rest during the storage interval after the following reading request pulse is generated, and the image signal stored for this storage interval is outputted synchronously with the next start pulse.

In contrast, in the case where the reading request pulses are respectively generated for two storage intervals that are continuous before and after, the original is driven for the later storage interval synchronously with the start pulse immediately after the preceding reading request pulse, and the image signal stored for this storage interval is outputted in response to the later reading request pulse.

As described above, according to the conventional image reading method, as an image signal which is outputted, there are two kinds of such image signals, viz., those stored when the original is at rest and those stored when the original is being driven. Thus, this causes a variation in scanning line density and the image cannot be read out accurately.

SUMMARY OF THE INVENTION

It is a first object of the present invention to prevent variation in scanning line density when an image is read out.

A second object of the invention is to improve a picture quality of an image which is obtained by reproducing the image signal read out.

Further, a third object of the invention is to improve the sub-scanning speed while preventing variation in scanning line density.

The above and other objects, features and advantages of the present invention will become apparent from the following detailed description with reference to the accompanying drawings.

BRIEF DESCRIPTION OF THE DRAWINGS

FIGS. 3A to 3C and FIGS. 4A to 4G are timing charts showing the signals in respective sections of the apparatus of FIG. 2 in the reading operation according to the invention, respectively.

DETAILED DESCRIPTION OF THE PREFERRED EMBODIMENT

An embodiment of the present invention will now be described in detail hereinbelow with reference to the drawings.

Figure 1:
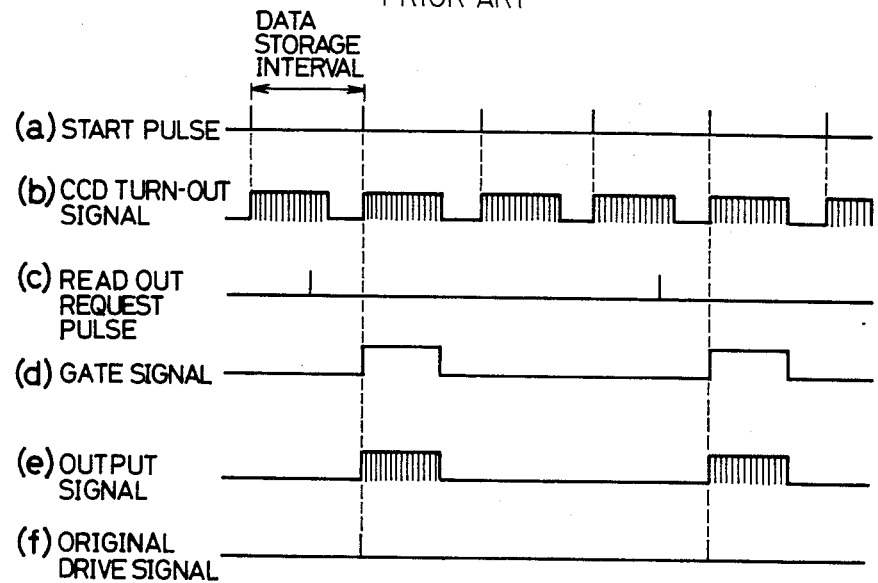
FIGS. 1(a) to 1(f) are timing charts of the signals in respective sections of an image reading apparatus in the reading operation according to a conventional image reading method.
Figure 2:
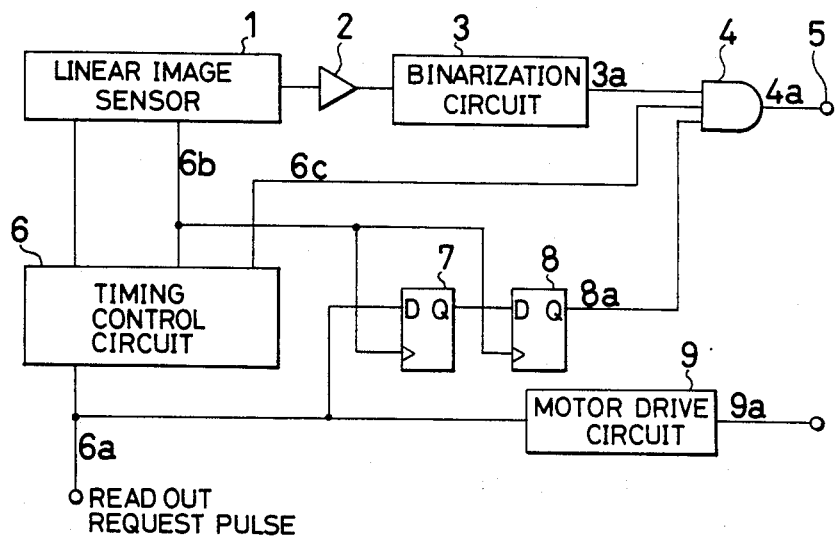
FIG. 2 is a block circuit diagram showing an arrangement of an image reading apparatus to which a method according to the present invention is applied.

FIG. 2 shows an arrangement of an image reading apparatus as an embodiment of the invention.

In the diagram, a linear image sensor 1 consisting of a CCD scans the surface of an original and performs the photo-electric conversion. The sensor 1 stores the charges, i.e., the image signal of one scanning line in correspondence to the amount of photo-reception for a predetermined period. This image signal is outputted as an analog signal to an amplifier 2 for the next storage interval. The linear image sensor 1 is composed of an exposing section and a shift register section, and the charges accumulated in the exposing section are transferred to the shift register section in response to a start pulse mentioned later, and are read out in response to a shift clock. The analog image signal amplified by the amplifier 2 is binarized by a binarization circuit 3 and thereafter is led to an input of an AND gate 4 through a signal line 3a. The output of the AND gate 4 is connected through a signal line 4a to an output terminal 5 of the image reading apparatus.

On the other hand, in the diagram, a timing control circuit 6 controls the whole operation of the image reading apparatus. This circuit 6 generates a start pulse to the linear image sensor 1 through a signal line 6b, thereby allowing the charges stored for the storage interval immediately before the generation of the start pulse to be transferred to the shift register section and also permitting the exposing section to store the next signal charges. Thereafter, the image signal stored for the storage interval just before the generation of such a start pulse is read out from the shift register section. On the other hand, the timing control circuit 6 sends a pulse signal which rises synchronously with the start pulse and trails synchronously with the end of reading to the AND gate 4 through a signal line 6c. In addition, the circuit 6 receives a reading request pulse from a host control system (not shown) of the image reading apparatus through a signal line 6a.

This reading request pulse is also led to a data input of a D flip flop 7 connected to the signal line 6a. A Q output of the D flip flop 7 is connected to a data input of another D flip flop 8, while a Q output of the D flip flop 8 is connected to an input of the AND gate 4 through a signal line 8a. Clock inputs of the D flip flops 7 and 8 are connected to the signal line 6b of the timing control circuit 6, thereby allowing the start pulse to be sent.

In addition, a motor drive circuit 9 drives a stepping motor (not shown) to move the original by one scanning line at a time in the sub-scanning direction (the direction which is nearly perpendicular to the main scanning direction). This motor drive circuit 9 is connected to the signal line 6a of the timing control circuit 6 and receives the reading request pulse and outputs a drive signal pulse to the stepping motor through a signal line 9a.

Next, the image reading operation of the image reading apparatus of this embodiment with such an arrangement described above will be explained with reference to FIGS. 3A to 3C and FIGS. 4A to 4G.

FIGS. 3A to 3C are timing charts of the signals in the respective section to explain the operation of the image reading apparatus in the case where no reading request pulse is received.

As shown in FIG. 3C, in the case where the reading request pulse is not sent to the timing control circuit 6 through the signal line 6a, the timing control circuit 6 sends the start pulse to the linear image sensor 1 through the signal line 6b at a predetermined period as shown in FIG. 3A.

Thus, the image signal is stored and read out synchronously with the start pulse. The image signal read out is amplified by the amplifier 2 and is binarized by the binarization circuit 3. This binary signal is periodically supplied through the signal line 3a to the AND gate 4 with a predetermined time width shorter than the storage interval synchronously with the start pulse as shown in FIG. 3B.

However, since the reading request pulse is not applied at this time, the D input of the D flip flop 7 is at a low level and the Q output of the D flip flop 8 at the next stage is at a low level, so that the AND gate 4 is closed and the binarized image signal is not outputted, i.e., the reading output of the image sensor 1 is discarded.

Next, FIGS. 4A to 4G are timing charts of the signals in the respective sections for explaining the operation of the image reading apparatus in the case where the reading request pulse is received.

As indicated at a reference numeral R1 in FIG. 4B, when the reading request pulse is sent to the timing control circuit 6 at time T1, the timing control circuit 6 is reset. Thus, the circuit 6 generates the start pulse to the linear image sensor 1 synchronously with this reading request pulse as indicated at a numeral S1 in FIG. 4A, thereby newly starting the storage of the image signal in the storage interval A and the readout of the image signal stored for the interval $\tau 1$ immediately before the generation of that start pulse. The signal read out is amplified and binarized and is outputted through the signal line 3a to the AND gate 4 as shown in FIG. 4C.

On the other hand, the reading request pulse R1 and timing pulse S1 are simultaneously inputted to the data and clock inputs of the D flip flop 7, so that the Q output of the D flip flop 7, i.e., the data input of the D flip flop 8 becomes a high level. However, since the start pulse S1 has already trailed at that time and the clock input of the D flip flop 8 has become a low level, the Q output of the D flip flop 8 is held at a low level. That is, as shown in FIG. 4E, the output on the signal line 8a at this time is at a low level and the AND gate 4 is not opened, so that the above-mentioned binarized image signal is not outputted but discarded.

On one hand, when the motor drive circuit receives the former reading request pulse R1, it generates a drive pulse to the stepping motor through the signal line 9a synchronously with that pulse R1 as shown in FIG. 4G, thereby allowing the original to be moved by one scanning line.

Next, as shown in FIG. 4A, after completion of the storage interval A of a predetermined length, the timing control circuit generates a next start pulse S2. Thus, in the linear image sensor 1, the signal charges stored in the exposing section for the storage interval A are transferred to the shift register section. At the same time, the storage of the new image signal is started. Then, the image signal stored for the storage interval A is read out. The image signal read out is amplified and binarized and is supplied to the AND gate 4 as indicated at A' in FIG. 4C.

On the other hand, the D flip flop 8 whose data input has already been at a high level receives the new start pulse S2 at its clock input, so that the Q output shown in FIG. 4E becomes a high level, causing the AND gate 4 to be opened. Due to this, as indicated at A" in FIG. 4F, the image signal is outputted to the output terminal 5 through the signal line 4a.

In addition, since the D flip flop 7 receives the start pulse S2 at its clock input and the Q output of the D flip flop 7 (i.e., the D input of the D flip flop 8) becomes a low level since the D input of the D flip flop 7 is at a low level.

Thereafter, as indicated at R2 in FIG. 4B, when the reading request pulse is generated, the above-mentioned operation is repeated. Also, the D flip flop 8 receives at its clock input a start pulse S3 which is generated synchronously with that reading request pulse, so that the Q output of the D flip flop 8 shown in FIG. 4E becomes a low level, causing the AND gate 4 to be closed.

As described above, in the image reading method according to the present invention, the storage of the image signal and the movement of the original by one scanning line are performed synchronously with the reading request pulse, and after a predetermined storage interval, the image signal stored is outputted. Namely, since the storage of the image signal which should be outputted and the movement of the original are always executed synchronously, there occurs no variation in scanning line density such as could be caused in the conventional method due to the unstable timings for the storage of the image signal and the movement of the original.

As will be obvious from the above description, in the image reading method according to the present invention, the image signal of one scanning line of the original is stored in the image sensor synchronously with the reading request pulse, and at the same time the original is moved by one scanning line synchronously with that reading request pulse and the image signal which is outputted from the image sensor for the next storage interval is read out; therefore, the timings for the storage of the image signal that should be read out and for the movement of the original always coincide, so that the image can be accurately read out without causing the variation in scanning line density. In addition, since the storage of the image signal is started synchronously with the reading request, the vain time can be omitted, thereby enabling the whole reading time to be shortened.

Although the present invention has been shown and described with respect to a particular embodiment, various changes and modifications which are obvious to a person skilled in the art to which the invention pertains are deemed to lie within the spirit and scope of the invention.

What we claim is:

1. An original document reading apparatus, comprising:

reading means for reading an original document line by line, said reading means being actuated at a predetermined cyclic period, wherein, in a first period, read information is stored, and in a second period, said read information is output, such that the output operation for one line on the original document and the storage operation for the next line are performed in parallel;

transporting means for transporting the original document line by line relative to said reading means;
   means for generating a reading request signal at an irregular period; and
   controlling means for allowing the storing operation of said reading means and the transporting operation of said transporting means to start in synchronism with said reading request signal.

2. An apparatus according to claim 1, wherein said reading means comprises a storage section for storing the read information and a transferring section for outputting the read information, and wherein the information stored in said storage section is transferred to said transferring section in synchronism with said reading request signal and said storage section then starts the storing operation.

3. An apparatus according to claim 2, further comprising gate means for fetching, as a reading signal, only the information which is stored in said storage section during the transporting operation of said transporting means.

4. An apparatus according to claim 1, wherein said reading means includes a charge coupled device.

5. An original document reading apparatus, comprising:

reading means for reading an original document line by line;
   transporting means for transporting line by line the original document relative to said reading means;
   means for generating a reading request signal at an irregular period;
   controlling means for allowing reading by said reading means and transporting by said transporting means to start in synchronism with said reading request signal; and
   means for outputting, as a reading signal, only the information which is read by said reading means during the transporting operation of said transporting means.

6. An apparatus according to claim 5, wherein said reading means comprises a storage section for storing the read information and a transferring section for outputting the read information, and wherein the information stored in said storage section in synchronism with said reading request signal and said storage section then starts the storing operation.

7. An apparatus according to claim 5, wherein said reading means includes a charge coupled device.

* * * * *

UNITED STATES PATENT AND TRADEMARK OFFICE
CERTIFICATE OF CORRECTION

PATENT NO. : 4,663,672
DATED : May 5, 1987
INVENTOR(S) : MASAHIRO SAKAMOTO

It is certified that error appears in the above-identified patent and that said Letters Patent is hereby corrected as shown below:

AT [56] UNDER U.S. PATENT DOCUMENTS

"Ogawawara" should read --Ogasawara--.

COLUMN 1

Line 13, "sensor for" should read --sensor, for--.

COLUMN 5

Line 38, "What we claim is:" should read --What I claim is:--.

Signed and Sealed this

Fifteenth Day of September, 1987

Attest:

DONALD J. QUIGG

*Attesting Officer*     *Commissioner of Patents and Trademarks*